(12) United States Patent
Mitta et al.

(10) Patent No.: US 8,822,587 B2
(45) Date of Patent: Sep. 2, 2014

(54) VINYL CHLORIDE-BASED RESIN EMULSION, METHOD FOR PRODUCING SAME, WATER-BASED INK, AND RECORDING PAPER

(75) Inventors: Yasuhiro Mitta, Echizen (JP); Yuji Gama, Echizen (JP)

(73) Assignee: Nissin Chemical Industry Co., Ltd., Echizen-shi, Fukui-ken (JP)

( * ) Notice: Subject to any disclaimer, the term of this patent is extended or adjusted under 35 U.S.C. 154(b) by 0 days.

(21) Appl. No.: 14/000,504

(22) PCT Filed: Mar. 14, 2012

(86) PCT No.: PCT/JP2012/056512
§ 371 (c)(1),
(2), (4) Date: Aug. 20, 2013

(87) PCT Pub. No.: WO2012/128138
PCT Pub. Date: Sep. 27, 2012

(65) Prior Publication Data
US 2013/0331504 A1    Dec. 12, 2013

(30) Foreign Application Priority Data

Mar. 18, 2011 (JP) ................................. 2011-060533

(51) Int. Cl.
| | | |
|---|---|---|
| C08L 27/06 | (2006.01) | |
| C09D 11/00 | (2014.01) | |
| C08F 2/24 | (2006.01) | |
| D21H 19/20 | (2006.01) | |
| C09D 11/10 | (2014.01) | |
| C08F 214/08 | (2006.01) | |
| C08F 214/06 | (2006.01) | |
| B41M 5/52 | (2006.01) | |

(52) U.S. Cl.
CPC .............. *C09D 11/107* (2013.01); *C09D 11/30* (2013.01); *C08F 2/24* (2013.01); *D21H 19/20* (2013.01); *C09D 11/106* (2013.01); *C08F 214/08* (2013.01); *B41M 5/5218* (2013.01); *C08F 214/06* (2013.01); *B41M 5/5254* (2013.01)
USPC .......................................... 524/467; 428/522

(58) Field of Classification Search
USPC .......................................... 524/467; 428/522
See application file for complete search history.

(56) References Cited

U.S. PATENT DOCUMENTS

| | | | |
|---|---|---|---|
| 4,279,653 | A | 7/1981 | Makishima et al. |
| 4,517,244 | A | 5/1985 | Kobayashi et al. |
| 5,147,926 | A | 9/1992 | Meichsner et al. |
| 5,913,971 | A | 6/1999 | Fujimatsu et al. |
| 7,981,837 | B2 | 7/2011 | Shinohara et al. |
| 2011/0124801 | A1 | 5/2011 | Mitta et al. |

FOREIGN PATENT DOCUMENTS

| | | |
|---|---|---|
| JP | 53-61412 | 6/1978 |
| JP | 54-89811 A | 7/1979 |
| JP | 55-51583 A | 4/1980 |
| JP | 55-65269 A | 5/1980 |
| JP | 56-84992 A | 7/1981 |
| JP | 56-148584 A | 11/1981 |
| JP | 58-24493 A | 2/1983 |
| JP | 61-235478 A | 10/1986 |
| JP | 62-288076 A | 12/1987 |
| JP | 02-238015 A | 9/1990 |
| JP | 08-253716 A | 10/1996 |
| JP | 09-12956 A | 1/1997 |
| JP | 10-176132 A | 6/1998 |
| JP | 11-35866 A | 2/1999 |
| JP | 11-123867 A | 5/1999 |
| JP | 2001-199152 A | 7/2001 |
| JP | 2008-30450 A | 2/2008 |
| JP | 2009-120761 A | 6/2009 |
| JP | 2011-12226 A | 1/2011 |
| WO | 2010/140647 A1 | 12/2010 |

OTHER PUBLICATIONS

International Search Report dated May 22, 2012, issued in corresponding application No. PCT/JP2012/056512.

*Primary Examiner* — Peter Szekely
(74) *Attorney, Agent, or Firm* — Westerman, Hattori, Daniels & Adrian, LLP

(57) ABSTRACT

A vinyl chloride-based resin emulsion obtained by using a vinyl chloride-based polymer emulsion, which is obtained by subjecting a vinyl chloride monomer (B) or a monomer mixture comprising a vinyl chloride monomer (B) and an ethylenically unsaturated group-containing monomer (C) to emulsion polymerization in the presence of (A) a styrene-acrylic acid ester oligomer and/or an acrylic acid ester oligomer, as a seed (D), and subjecting a vinyl chloride monomer (E) or a monomer mixture comprising a vinyl chloride monomer (E) and an ethylenically unsaturated group-containing monomer (F) to emulsion polymerization using the seed (D). This vinyl chloride-based resin emulsion exhibits excellent water resistance, moisture resistance, high gloss and alcohol resistance if used in a water-based ink and exhibits excellent color development properties, water resistance, moisture resistance, color visibility, high gloss and release properties if used in a recording paper.

14 Claims, No Drawings

VINYL CHLORIDE-BASED RESIN EMULSION, METHOD FOR PRODUCING SAME, WATER-BASED INK, AND RECORDING PAPER

TECHNICAL FIELD

This invention relates to a vinyl chloride-based resin emulsion which is useful as a binder for ink, paint, inorganic dispersion or the like, a receiving layer on recording sheets, a textile treating agent and the like. More particularly, it relates to a vinyl chloride-based resin emulsion which exhibits excellent water resistance, humidity resistance, high gloss and alcohol resistance when used in aqueous ink, and excellent color development, humidity resistance, color visual perception, high gloss and parting property when used in recording sheets, and a method for preparing the same. It also relates to an aqueous ink composition and recording sheet using the vinyl chloride resin emulsion.

BACKGROUND ART

Reference is first made to gravure printing ink. In general printing, the quality of printing depends on the printability and printing effect of printing ink. The printability is a set of properties associated with the behavior of ink from transfer of ink on a printing machine to an object to be printed to completion of a printed surface, the properties mainly including fluidity, interfacial compatibility and drying of ink. On the other hand, the printing effect is the finish of printing that the ink having formed a printed surface develops, evaluated in terms of such properties as color tone, gloss, water resistance, and blocking resistance. Ink is basically composed of a coloring matter (dye or pigment), vehicle, and auxiliary agents (flow adjusting agents, drying adjusting agents, etc.). Of these, the vehicle has the most impact on the printability and printing effect. The vehicle is basically composed of a binder, wax, solvent and the like. By a choice of the binder, the nature of the vehicle is substantially changed, on which the printability and printing effect largely depend.

The binders are generally classified into solvent binders and aqueous binders. The solvent binders include urethane resins as proposed in JP-A H09-12956 (Patent Document 1). Nowadays, however, the considerations of air pollution, fire risk and working hygiene turn attention to the aqueous binders not using organic solvents.

The aqueous binders are generally divided into alkali soluble resins as typified by styrene-acrylic resins, water-soluble resins as typified by polyvinyl alcohol, and water-dispersed resins as typified by urethane emulsions (Patent Document 2: JP-A H02-238015) and acrylic emulsions.

In general, in the case of printing using an aqueous ink comprising a water-dispersed resin as the binder, the ink is applied from a printer onto an area to be printed at room temperature, and thereafter dried at or above the glass transition temperature of the water-dispersed resin until finished. When heated at or above the glass transition temperature, overall resin particles fuse together to form a uniform film which develops and improves water resistance. With an attention paid to drying on the printer among printability factors, the printing ink must maintain fluidity on the printer for a time as long as possible without drying. In this regard, the solvent type resin, alkali-soluble resin and water-soluble resin are non-problematic in that even if the resin once becomes a dry film, the resin resumes original fluidity when dissolved in solvent, alkaline aqueous solution or water, whereas the water-dispersed resin is problematic in that once the resin is dry so that resin particles fuse together at their surface, the resin does not resume fluidity even when contacted with water, leading to a failure of printing. On the other hand, the alkali-soluble resin suffers from poor alkali resistance and the water-soluble resin suffers from poor water resistance. Then conventional binders are sometimes prepared by combining the alkali-soluble resin or water-soluble resin with the water-dispersed resin. In the state-of-the-art, an attempt to improve printability encounters a loss of alkali or water resistance while an attempt to improve alkali or water resistance leads to insufficient printability.

To solve the problem, JP-A H10-176132 (Patent Document 3) proposes a binder for aqueous ink comprising a monomer selected from vinyl chloride, an alkyl (meth)acrylate having an alkyl moiety of 1 to 18 carbon atoms, and a monoalkenylbenzene, an ethylenically unsaturated monomer having a functional group, and another ethylenically unsaturated monomer. However, problems remain with respect to humidity resistance and gloss.

Also fluoroplastics are proposed in Patent Document 4: JP-A H11-35866. Although fluoroplastics are excellent in many aspects including weather resistance and corrosion resistance, a cost problem is inevitably left.

Reference is now made to inkjet ink. The inkjet recording system is excellent in quiet, recording speed, setting quality and running cost, and is generally on widespread use. For use in this system, an aqueous ink is selected from the aspects of ink physical properties, safety, and ease of handling. Ink compositions having a water-soluble dye such as an acidic dye, direct dye or basic dye, dissolved in a glycol solvent and water are known from Patent Documents 5 to 7: JP-A S53-61412, JP-A S54-89811, and JP-A S55-65269. They have the drawback of poor water resistance.

Thus the use of pigments as the coloring component is under investigation. Acrylic resins or styrene-acrylic resins having carboxyl groups incorporated therein (Patent Document 8: JP-A S61-235478) and aqueous resins in the form of ternary copolymers of acrylic acid, styrene and alpha-methylstyrene (Patent Document 9: JP-A H08-253716) are used to disperse pigments. Although improvements in water resistance and weather resistance are noticeable, there is left a room for improvement in dispersion (change with time) of pigments.

Next, reference is made to the receiving layer of recording sheets, especially of inkjet recording sheets. Currently the recording system using aqueous ink is often employed in the printer in the business machine system including personal computers, and accordingly the demand for recording material suited for that system is increasing. Meanwhile, a recording material having better characteristics is required in order to achieve further improvements in quality, colorfulness, appearance and definition of printed images. The recording material is used in diversified applications while requirements of properties such as water resistance and color development become increasingly stricter. As a typical receiving layer, there are proposed a recording sheet in which amorphous silica and a polymeric binder such as polyvinyl alcohol are combined and coated on a base paper (Patent Document 10: JP-A S55-51583) and a recording sheet comprising a base paper provided on front and back surfaces with an ink receiving layer containing porous pigment particles (Patent Document 11: JP-A S56-148584). Although a significant improvement in colorfulness or sharpness is achieved as compared with conventional recording sheets using wood-free paper, these receiving layers have the problems that a reduced coating weight allows for irregular spread of ink, resulting in printed images with substantial bleeding and that with an increased coating weight, bleeding is reduced, but the coating layer tends to spall off, causing dusting.

Patent Document 12: JP-A S62-288076 proposes a recording sheet in which binding strength is improved using a water-insoluble resin obtained from reaction of polyvinyl alcohol with acrylic acid and methyl methacrylate. Since this water-insoluble resin is anionic, fixation of an aqueous ink which is also anionic is adversely affected, failing to provide a solution capable of preventing ink bleeding or improving water resistance.

Further proposed are a recording sheet comprising a polycation polymeric electrolyte (Patent Document 13: JP-A S56-84992), a recording sheet comprising an ink receiving layer composed mainly of an ink-adsorbing cationic polymer binder (Patent Document 14: JP-A S58-24493), and a recording sheet comprising a cationic acrylic resin emulsion (Patent Documents 15 and 16: JP-A H11-123867 and JP-A 2001-199152). These proposals are not necessarily satisfactory with respect to color development and water resistance.

The receiving layers on recording sheets include those of the thermal transfer recording system. Among others, the dye diffusion transfer recording system is deliberately considered as the process capable of forming color hard copies having the closest image quality to the image quality of the silver salt photography. It is proposed to use a vinyl chloride resin in such receiving layer (Patent Document 17: JP-A 2008-30450). Since a low molecular weight emulsifier is used, the receiving layer is not necessarily satisfactory with respect to dye oozing and humidity resistance.

Further, the inventors proposed in Patent Document 18: PCT/JP2010/59418 a vinyl chloride resin using an acrylate oligomer. Since the polymerization ratio of vinyl chloride unit in polymer is low, there is left a room for improvement in parting property.

SUMMARY OF INVENTION

Technical Problem

An object of the invention, which has been made under the above-mentioned circumstances, is to provide a vinyl chloride resin emulsion which exhibits excellent water resistance, humidity resistance, high gloss, and alcohol resistance when used in aqueous ink, and excellent color development, water resistance, humidity resistance, color visual perception, high gloss, and parting property when used in recording sheets, and which may be advantageously utilized as a binder for ink, paint, inorganic dispersion or the like, a receiving layer for recording sheets, a textile treating agent and the like; and a method for preparing the emulsion. Another object of the invention is to provide an aqueous ink composition and recording sheet using the vinyl chloride resin emulsion.

Solution to Problem

Making extensive investigations to attain the above object, the inventors have found that the outstanding problems can be overcome by a vinyl chloride resin emulsion which is obtained from emulsion polymerization of 100 parts by weight of a vinyl chloride monomer (B) or a monomer mixture of a vinyl chloride monomer (B) and an ethylenically unsaturated group-containing monomer (C) copolymerizable therewith in the presence of 40 to 500 parts by weight (A) a styrene-acrylic acid ester oligomer and/or an acrylic acid ester oligomer, to form a vinyl chloride polymer as a seed (D), and subsequent emulsion polymerization of a vinyl chloride monomer (E) or a monomer mixture of a vinyl chloride monomer (E) and an ethylenically unsaturated group-containing monomer (F) copolymerizable therewith, using the seed (D). The present invention is predicated on this finding.

Accordingly, the invention provides a vinyl chloride resin emulsion, a method for preparing the emulsion, an aqueous ink composition, and a recording sheet.

[1] A vinyl chloride resin emulsion which is obtained by
emulsion polymerizing 100 parts by weight of a vinyl chloride monomer (B) or a monomer mixture of a vinyl chloride monomer (B) and an ethylenically unsaturated group-containing monomer (C) copolymerizable therewith in the presence of 40 to 500 parts by weight of (A) a styrene-acrylic acid ester oligomer and/or an acrylic acid ester oligomer, to form a vinyl chloride polymer emulsion as a seed (D), and
emulsion polymerizing 100 parts by weight of a vinyl chloride monomer (E) or a monomer mixture of a vinyl chloride monomer (E) and an ethylenically unsaturated group-containing monomer (F) copolymerizable therewith, using 3 to 50 parts by weight as solids of the seed (D).

[2] The vinyl chloride resin emulsion of [1] wherein the oligomer (A) has a number average molecular weight of 5,000 to 50,000.

[3] The vinyl chloride resin emulsion of [1] or [2] wherein the seed (D) has an average particle size of 20 to 800 nm.

[4] A method for preparing a vinyl chloride resin emulsion, comprising the steps of:
emulsion polymerizing 100 parts by weight of a vinyl chloride monomer (B) or a monomer mixture of a vinyl chloride monomer (B) and an ethylenically unsaturated group-containing monomer (C) copolymerizable therewith in the presence of 40 to 500 parts by weight (A) a styrene-acrylic acid ester oligomer and/or an acrylic acid ester oligomer, to form a vinyl chloride polymer emulsion as a seed (D), and
emulsion polymerizing 100 parts by weight of a vinyl chloride monomer (E) or a monomer mixture of a vinyl chloride monomer (E) and an ethylenically unsaturated group-containing monomer (F) copolymerizable therewith, using 3 to 50 parts by weight as solids of the seed (D).

[5] The method of [4] wherein the oligomer (A) has a number average molecular weight of 5,000 to 50,000.

[6] The method of [4] or [5] wherein the seed (D) has an average particle size of 20 to 800 nm.

[7] An aqueous ink composition comprising the vinyl chloride resin emulsion of any one of [1] to [3].

[8] The aqueous ink composition of [7] wherein the vinyl chloride resin emulsion is present in an amount of 2 to 30% by weight as solids, said composition further comprising 3 to 40% by weight of a colorant, 0 to 50% by weight of a water-soluble organic solvent, and 5 to 95% by weight of water.

[9] A recording sheet having a coating of the vinyl chloride resin emulsion of any one of [1] to [3].

[10] The recording sheet of [9] wherein said coating forms a receiving layer.

[11] The recording sheet of [9] or [10] wherein said coating is formed from a composition comprising 2 to 30% by weight as solids of the vinyl chloride resin emulsion, and further comprising 0 to 30% by weight of a pigment, 0 to 60% by weight of a water-soluble organic solvent, and 5 to 98% by weight of water.

Advantageous Effects of Invention

The vinyl chloride resin emulsion of the invention may be advantageously utilized as a binder for ink, paint, inorganic dispersion or the like, a receiving layer for recording sheets, a textile treating agent and the like since the emulsion exhibits excellent water resistance, humidity resistance, high gloss, and alcohol resistance when used in aqueous ink, and excellent color development, water resistance, humidity resistance, color visual perception, high gloss, and parting property when used in recording sheets.

DESCRIPTION OF EMBODIMENTS

The invention provides a vinyl chloride resin emulsion which is obtained by emulsion polymerizing 100 parts by weight of a vinyl chloride monomer (B) or a monomer mixture of a vinyl chloride monomer (B) and an ethylenically unsaturated group-containing monomer (C) copolymerizable therewith in the presence of 40 to 500 parts by weight of (A) a styrene-acrylic acid ester oligomer and/or an acrylic acid ester oligomer, preferably having a number average molecular weight of 5,000 to 50,000, to form a vinyl chloride polymer emulsion as a seed (D), and further emulsion polymerizing 100 parts by weight of a vinyl chloride monomer (E) or a monomer mixture of a vinyl chloride monomer (E) and an ethylenically unsaturated group-containing monomer (F) copolymerizable therewith, using 3 to 50 parts by weight as solids (i.e., vinyl chloride polymer) of the seed (D).

First, the preparation of seed (D) is described.

The styrene-acrylic acid ester oligomer and acrylic acid ester oligomer (A) are derived from acrylic acid ester monomers which include methyl (meth)acrylate, ethyl (meth)acrylate, and butyl (meth)acrylate. As used herein, the term "(meth)acrylic" refers to both acrylic and methacrylic. Commercially available are JONCRYL JDX-6500, JONCRYL JDX-6102B, JONCRYL HPD-96J, and JONCRYL 52J (all from BASF AG). The monomers are not limited thereto while they may be used alone or in admixture of two or more. The weight ratio of styrene/acrylate is preferably from 50/50 to 0/100.

The amount of the oligomer used is preferably 40 to 500 parts by weight and more preferably 100 to 300 parts by weight relative to 100 parts by weight of (B) a vinyl chloride monomer or a monomeric mixture of (B) a vinyl chloride monomer and (C) an ethylenically unsaturated monomer copolymerizable therewith. Less than 40 parts by weight may give rise to problems like formation of agglomerates, whereas more than 500 parts by weight may give rise to problems such as inactivated reaction and a failure of consistent production.

The styrene-acrylic acid ester oligomer and acrylic acid ester oligomer (A) preferably have a number average molecular weight of 5,000 to 50,000 and more preferably 8,000 to 20,000. A molecular weight of less than 5,000 may give rise to problems like formation of agglomerates, whereas a molecular weight in excess of 50,000 may give rise to problems like mass formation of agglomerates and at worst, gelation. It is noted that the number average molecular weight is as measured by gel permeation chromatography (GPC) versus polystyrene standards. In the disclosure, those compounds having a number average molecular weight of up to 50,000 are referred to as oligomers.

Examples of the ethylenically unsaturated monomer (C) copolymerizable with vinyl chloride monomer include vinyl acetate, ethylene, propylene, and vinylidene chloride, as well as vinyl carboxylate monomers such as vinyl propionate; aromatic vinyl monomers such as styrene and α-methylstyrene; conjugated diene monomers such as 1,3-butadiene and 2-methyl-1,3-butadiene; ethylenically unsaturated monocarboxylic acid esters such as methyl acrylate, ethyl acrylate, butyl acrylate, 2-ethylhexyl acrylate, and methyl methacrylate; ethylenically unsaturated polycarboxylic acid esters such as dimethyl itaconate, diethyl maleate, monobutyl maleate, monoethyl fumarate, and dibutyl fumarate; ethylenically unsaturated monocarboxylic acids such as acrylic acid, methacrylic acid, and crotonic acid; ethylenically unsaturated dicarboxylic acids such as itaconic acid, maleic acid and fumaric acid; epoxy-containing monomers such as glycidyl methacrylate; alcoholic hydroxyl-containing monomers such as 2-hydroxyethyl methacrylate; alkoxyl-containing monomers such as methoxyethyl acrylate; nitrile-containing monomers such as acrylonitrile; amide-containing monomers such as acrylamide; amino-containing monomers such as dimethylaminoethyl methacrylate; and monomers having at least two ethylenically unsaturated groups in the molecule, such as divinyl benzene and allyl methacrylate. One or more may be selected from the foregoing examples. Inter alia, vinyl acetate, ethylenically unsaturated monocarboxylic acid esters, and ethylenically unsaturated monocarboxylic acids are preferred.

A proportion of vinyl chloride monomer (B) to copolymerizable ethylenically unsaturated monomer (C) is preferably between 50:50 and 100:0, more preferably between 70:30 and 100:0, in weight ratio. Too low a proportion of vinyl chloride may lead to the disadvantage of formation of agglomerates, failing to form the desired vinyl chloride-based emulsion according to the invention.

The seed (D) thus obtained preferably has a solids content of 20 to 40% by weight, an average particle size of 20 to 800 nm, and an average degree of polymerization of 300 to 1,000. The polymerization step to form the seed (D) is controlled so that the seed (D) may meet these parameters.

Next, emulsion polymerization of a vinyl chloride monomer (E) or a monomer mixture of a vinyl chloride monomer (E) and an ethylenically unsaturated group-containing monomer (F) copolymerizable therewith is carried out using the seed (D), which step is described below.

Examples of the ethylenically unsaturated group-containing monomer (F) copolymerizable with vinyl chloride monomer (E) are the same as exemplified above for monomer (C). A proportion of vinyl chloride monomer (E) to copolymerizable ethylenically unsaturated monomer (F) is preferably between 50:50 and 100:0, more preferably between 80:20 and 100:0, in weight ratio. Too low a proportion of vinyl chloride may lead to the risk of agglomerate formation.

The amount of seed (D) used is 3 to 50 parts by weight, preferably 5 to 30 parts by weight, as solids, relative to 100 parts by weight of vinyl chloride monomer (E) or a monomer mixture of vinyl chloride monomer (E) and copolymerizable ethylenically unsaturated group-containing monomer (F). Less than 3 parts by weight of seed (D) may lead to the disadvantage of mass formation of agglomerates whereas more than 50 parts by weight may lead to the disadvantage of agglomerate formation. In the practice of the invention, the seed is preferably added prior to polymerization reaction of a vinyl chloride-based emulsion (during charging). Then polymerization of vinyl chloride is promoted, and an emulsion having the desired properties is obtainable even if an emulsifier is not used for polymerization.

For both the polymerization to form seed (D) and the subsequent emulsion polymerization of vinyl chloride monomer (E) or a monomer mixture of vinyl chloride monomer (E) and copolymerizable ethylenically unsaturated group-containing monomer (F) using seed (D), any well-known emulsion polymerization techniques may be used. The monomers and polymerization aids (e.g., emulsifiers such as alkyl sulfate ester salts, polymerization initiators such as ammonium persulfate, chain transfer agents such as mercaptans, pH adjusting agents such as sodium carbonate, and defoamers)

may be initially added in a lump or continuously added, or some may be added continuously or in divided portions during polymerization.

Also a nonionic surfactant and anionic emulsifier may be used insofar as the desired effects of the invention are not compromised. Exemplary surfactants include polyoxyethylene alkyl phenyl ethers, polyoxyethylene alkyl ethers, polyoxyethylene fatty acid esters, sorbitan fatty acid esters, polyoxyethylene sorbitan fatty acid esters, polyoxyalkylene alkyl ethers, polyoxyethylene derivatives, glycerol fatty acid esters, polyoxyethylene-hardened castor oil, polyoxyethylene alkyl amines, alkyl alkanol amides, or acetylene alcohol, acetylene glycol and ethylene oxide adducts thereof.

Examples of the polymerization initiator used in the emulsion polymerization include persulfate salts such as ammonium persulfate and potassium persulfate; azo compounds such as 2,2'-diamidino-2,2'-azopropane dihydrochloride salt and azobisisobutyronitrile; peroxides such as cumene hydroperoxide, benzoyl peroxide, and hydrogen peroxide; and tartaric acid. Also useful are well-known redox initiators such as potassium persulfate and sodium hydrogen sulfite. An amount of the polymerization initiator used is generally 0.1 to 2.0% by weight, preferably 0.2 to 1.0% by weight based on the monomers.

The temperature at which emulsion polymerization is carried out is generally in the range of 40 to 80° C., desirably 50 to 70° C. The polymerization time may be determined as appropriate, although it is preferably 10 to 15 hours. Polymerization is desirably carried out in an inert gas atmosphere such as nitrogen gas.

The solid content is preferably 10 to 50% by weight, more preferably 20 to 40% by weight. If the residue is less than 10% by weight, agglomerates may form. If the residue exceeds 50% by weight, a large amount of agglomerates may form.

It is noted that at the end of polymerization, a plasticizer, inorganic or organic filler, thickener and the like may be added insofar as the performance of the aqueous ink binder or receiving layer of recording sheet using the inventive emulsion is not compromised.

The resulting emulsion may have an average particle size of 50 to 2,000 nm, preferably 100 to 1,000 nm, and a viscosity of 5 to 2,000 mPa·s at 23° C.

While the resin emulsion may be used in a variety of applications, it exhibits excellent color development, water resistance, humidity resistance, and high gloss when used in recording sheets, and excellent water resistance, humidity resistance, color visual perception, high gloss, and alcohol resistance when used in aqueous ink.

In one embodiment wherein the vinyl chloride resin emulsion is used in aqueous ink, an ink composition may be prepared by blending the vinyl chloride resin emulsion with a colorant, a water-soluble organic solvent, various additives, water and the like, and dispersing and mixing on a well-known dispersing machine, mixer, kneader or mill. The content of the vinyl chloride resin emulsion in the aqueous ink composition is preferably 2 to 30% by weight, more preferably 5 to 20% by weight, calculated as solids. A content of less than 2% by weight may lead to drawbacks like exacerbated adhesion whereas more than 30% by weight may lead to drawbacks like a viscosity buildup.

The colorant used herein may be dyes, pigments or the like, and is preferably present in an amount of 3 to 40% by weight, more preferably 5 to 30% by weight of the aqueous ink composition. Examples of the water-soluble organic solvent include ethylene glycol monoether, diethylene glycol monoether, propylene glycol monoether, ethylene glycol dimethyl ether, diethylene glycol dimethyl ether, ethylene glycol, diethylene glycol, propylene glycol, glycerol, methanol, ethanol, isopropyl alcohol, methyl ethyl ketone, methyl cellosolve, ethyl cellosolve, acetone, ethyl acetate, and diacetone alcohol. The water-soluble organic solvent is preferably present in an amount of 0 to 50% by weight, more preferably 0 to 40% by weight of the aqueous ink composition. Water is preferably present in an amount of 5 to 95% by weight, more preferably 10 to 90% by weight of the aqueous ink composition. Suitable additives include pigment dispersants, leveling agents, defoamers and the like, and these additives may be added in standard amounts commonly used in aqueous ink.

In the other embodiment wherein the vinyl chloride resin emulsion is used in recording sheets, it is advantageously used to form a receiving layer on recording sheets. A composition which is used to form the receiving layer may be prepared by blending the vinyl chloride resin emulsion with a pigment, a water-soluble organic solvent, various additives, water and the like, and dispersing and mixing on a well-known dispersing machine, mixer, kneader or mill. In the receiving layer-forming composition comprising the vinyl chloride resin emulsion, the content of the vinyl chloride resin emulsion is preferably 2 to 30% by weight, more preferably 5 to 20% by weight, calculated as solids.

Examples of the pigment which can be compounded herein include amorphous synthetic silica, aluminum silicate, magnesium silicate, precipitated calcium carbonate, heavy calcium carbonate, calcium silicate, aluminum hydroxide, zeolite, fired clay, kaolin clay, talc, and white carbon. The pigment is preferably present in an amount of 0 to 30% by weight, more preferably 0 to 20% by weight.

Examples of the water-soluble organic solvent include ethylene glycol monoether, diethylene glycol monoether, propylene glycol monoether, ethylene glycol dimethyl ether, diethylene glycol dimethyl ether, ethylene glycol, diethylene glycol, propylene glycol, glycerol, methanol, ethanol, isopropyl alcohol, methyl ethyl ketone, methyl cellosolve, ethyl cellosolve, acetone, ethyl acetate, and diacetone alcohol. The water-soluble organic solvent is preferably present in an amount of 0 to 60% by weight, more preferably 0 to 50% by weight of the aqueous ink composition. Water is preferably present in an amount of 5 to 98% by weight, more preferably 10 to 90% by weight of the aqueous ink composition. Other additives which can be compounded herein include pigment dispersants, defoamers, colorants, antioxidants, UV absorbers, viscosity adjusting agents, parting agents and the like.

The receiving layer-forming composition may be applied (coated or sprayed) onto a substrate, typically commercially available paper, by a suitable coating means such as a brush, blade coater, air knife coater, curtain coater, Mayer bar coater, gravure coater, or roll coater and dried so as to provide a coating weight of 0.5 to 25 g/m² (i.e., a thickness of 0.5 to 100 μm), preferably 1 to 10 g/m², calculated as dry polymer solids.

EXAMPLES

Preparation Examples, Examples, and Comparative Examples are given below by way of illustration and not by way of limitation. In Examples, all parts and % are by weight.

(Preparation of Seeds)

[Seed #1]

A polymerization vessel equipped with a stirrer, condenser, thermometer and nitrogen gas inlet was purged with nitrogen and charged with 34 parts of deionized water, 15 parts of vinyl chloride, and 50 parts (active ingredient 30%) of JONCRYL JDX-6500 (by BASF AG, acrylate oligomer, number average molecular weight 10,000), which were heated at 60° C. with stirring. Further a solution of 0.1 part of ammonium persulfate (initiator) in 1 part of deionized water was added whereupon polymerization reaction was run for 24 hours.

When the internal pressure of the polymerization vessel reached 0 MPa, the residual monomer was removed in vacuum to 1,000 ppm. The vessel was then cooled below 40° C., yielding a polymer emulsion having a solid content of 30%, pH 7.5 and a viscosity of 10 mPa·s at 23° C. as measured by a Brookfield viscometer. By GPC, the emulsion was identified to be a vinyl chloride resin emulsion.

[Seeds #2 to #6]

Vinyl chloride resin emulsions were prepared by carrying out polymerization as in Seed #1 aside from using the formulation shown in Table 1.

The composition of Seeds #1 to #6 is shown in Table 1 together with their solid content, pH, average particle size, and viscosity as measured by the following evaluation methods. Average degree of polymerization: DOP is a weight average degree of polymerization as determined by gel permeation chromatography (GPC) versus polystyrene standards.

TABLE 1

| Composition (pbw) | | Seed #1 | Seed #2 | Seed #3 | Seed #4 | Seed #5 | Seed #6 |
|---|---|---|---|---|---|---|---|
| (A) | JONCRYL JDX-6500 | 100 | 200 | | 100 | 100 | 100 |
| | JONCRYL HPD-96J | | | 100 | | | |
| (B) | Vinyl chloride | 100 | 100 | 100 | 80 | 80 | 75 |
| (C) | Vinyl acetate | | | | 20 | | |
| | Ethyl acrylate | | | | | 20 | 20 |
| | Acrylic acid | | | | | | 5 |
| Solid content (%) | | 30 | 30 | 30 | 30 | 30 | 30 |
| pH | | 7.5 | 7.5 | 7.5 | 6.5 | 7.5 | 4.5 |
| Average particle size (nm) | | 30 | 30 | 150 | 400 | 300 | 600 |
| Average DOP | | 600 | 400 | 900 | 500 | 500 | 500 |
| Viscosity (mPa·s) | | 10 | 10 | 300 | 1,000 | 500 | 1,500 |

JONCRYL JDX-6500: BASF AG, acrylate oligomer, number average molecular weight = 10,000
JONCRYL HPD-96J: BASF AG, styrene-acrylate oligomer, number average molecular weight = 16,500

Example 1

A polymerization vessel equipped with a stirrer, condenser, thermometer and nitrogen gas inlet was purged with nitrogen and charged with 64 parts of deionized water, 27 parts of vinyl chloride, and 9 parts of Seed #1 (active ingredient 30%), which were heated at 60° C. with stirring. Further a solution of 0.1 part of ammonium persulfate (initiator) in 1 part of deionized water was added whereupon polymerization reaction was run for 24 hours.

When the internal pressure of the polymerization vessel reached 0 MPa, the residual monomer was removed in vacuum to 1,000 ppm. The vessel was then cooled below 40° C., yielding a polymer emulsion having a solid content of 30%, pH 7.0 and a viscosity of 10 mPa·s at 23° C. as measured by a Brookfield viscometer. By GPC, the emulsion was identified to be a vinyl chloride resin emulsion. The results are shown in Table 2.

Examples 2 to 13 and Comparative Examples 1 to 7

Vinyl chloride resin emulsions were prepared by carrying out polymerization as in Example 1 aside from using the formulation shown in Tables 2 and 3.

The vinyl chloride resin emulsions obtained in Examples 1 to 13 and Comparative Examples 1 to 7 were analyzed by the following evaluation methods, with the results also shown in Tables 2 and 3.

[Evaluation Methods]
<Measurement of Solid Content>

A test was carried out by weighing about 1 g of a vinyl chloride resin emulsion in an aluminum foil dish, holding the dish in a dryer for heating at 105-110° C. for 1 hour, taking out of the dryer, allowing to cool down in a desiccator, and measuring the weight of the dry sample. A solid content was computed according to the equation:

$$R=(D-A)/(W-A)\times 100 \quad \text{[Mathematical Formula 1]}$$

wherein R is a solid content (%), W is the weight (g) of the aluminum dish containing the sample prior to drying, A is the weight (g) of the aluminum dish, and D is the weight (g) of the aluminum dish containing the dry sample. Note that the aluminum dish had a diameter of 70 mm and a height of 12 mm.

<pH Measurement>

A vinyl chloride resin emulsion was directly measured for pH by a pH meter according to the pH measurement method of JIS Z8802.

<Viscosity Measurement by Brookfield Viscometer>

A vinyl chloride resin emulsion was measured for viscosity by a Brookfield viscometer (BM type, No. 1 rotor, 6 rpm) while maintaining the liquid temperature at 23±0.5° C.

<Average Particle Size>

It was measured by a light scattering particle size meter.

Sample Preparation
1. A sample was weighed in a disposable cup and diluted with deionized water at 25° C.
2. The diluted sample was filtered through a 300-mesh filter cloth.

| Liquid temperature: | 25° C. |
|---|---|
| Number of accumulations: | 100 |
| Number of measurement: | 1 |

Measurement

Once a proper concentration was confirmed, measurement was made under the above conditions. The result of measurement was confirmed satisfactory.

<Polymerization Stability>

A vinyl chloride resin emulsion was applied onto a glass plate by a doctor knife of 6 mil. A coating was visually observed to confirm whether or not agglomerates formed.
 ○: no agglomerates found
 ×: agglomerates formed I. Evaluation of Performance as Gravure Printing Ink A vinyl chloride resin emulsion (solid content 30%), 67 parts, was mixed with 5 parts of a pigment DISPERS RED SD-1011 and 28 parts of water to give a sample A.

Sample A was set on a table-top printer GRAVO-PROOF CM (Nissio Gravure Co., Ltd.), where the printing roll was rotated one turn to print on a commercially available paper sheet.

a) Water Resistance

The printed paper was set on a color fastness rubbing tester (Yasuda Seiki Seisakusho, Ltd.). Using water-wetted gauze, the rubbing test was carried out 25 cycles. On visual observation, the sample was rated according to the following criterion.
 ○: no color transfer to gauze
 Δ: some color transfer
 ×: complete color transfer, printed area color faded b) Humidity Resistance The printed paper was held at 50° C. and humidity 90% for one day, after which it was rated by visual observation according to the following criterion.
- ○: no bleeding in printed area
- Δ: some bleeding from printed area
- ×: full bleeding c) Gloss The printed area was measured for gloss by a gloss meter PG-1M (Nippon Denshoku Co., Ltd.), with a value at a light emitting/receiving angle of 60° being read out. Rating was made according to the following criterion.
- ○: gloss value of 90 or higher
- Δ: gloss value from 70 to less than 90
- ×: gloss value of less than 70 d) Alcohol Resistance

The printed paper was set on a color fastness rubbing tester (Yasuda Seiki Seisakusho, Ltd.). Using ethanol-wetted gauze, the rubbing test was carried out 25 cycles. On visual observation, the sample was rated according to the following criterion.
- ○: no color transfer to gauze
- Δ: some color transfer
- ×: complete color transfer, printed area color faded II. Evaluation of Performance as Inkjet Ink

[Preparation of Ink]

A vinyl chloride resin emulsion (solid content 30%), 67 parts, was mixed with 20 parts of carbon black MA100 (Mitsubishi Paper Mills, Ltd.) and 13 parts of water to give a sample B.

e) Tone

Sample B as prepared was coated on a commercially available paper sheet by a bar coater No. 4 so as to give a thickness of 9 μm (dry solid weight 3.6 g/m²) and dried at 40° C. for 30 seconds. The coated paper and the sample as prepared were visually observed for outer appearance, and rated according to the following criterion.
- ○: equivalent tone
- Δ: lack of black density
- ×: tone changed f) Adhesion Sample B as prepared was coated on a flexible vinyl chloride film (Superfilm Nontack E, Okamoto Co., Ltd.) by a bar coater No. 4 to a thickness of 9 μm (dry solid weight 3.6 g/m²) and dried at 40° C. for 30 seconds. Adhesive tape (Cellotape® by Nichiban Co., Ltd.) was applied to the coated film and peeled therefrom by a force of 150 Pa, and rating was made according to the following criterion.
- ○: no peel
- Δ: some peel
- ×: complete peel g) Dispersion (Aging Stability)

Sample B as prepared was allowed to stand at normal temperature for one week, after which sedimentation with time was visually observed, and rated according to the following criterion.
- ○: no sediment
- Δ: sedimented, but restorable by agitation
- ×: sedimented, not restorable III. Evaluation of Performance as Inkjet Receiving Layer

[Preparation of Inkjet Receiving Layer]

A vinyl chloride resin emulsion was coated on a commercially available paper sheet to a thickness of 9 μm (dry solid weight 3.3 g/m²) by a bar coater No. 4 and dried at 40° C. for 30 seconds, giving sample C.

h) Color Development

Using a printer EPSON PM-800C, three colors of yellow, cyan and magenta were printed on sample C. The density of each color was rated by visual observation according to the following criterion.
- ○: clearly printed without decolorization
- Δ: partially decolorized
- ×: decolorized and color faded i) Ink Absorption (Water Resistance)

The printed paper was set on a color fastness rubbing tester (Yasuda Seiki Seisakusho, Ltd.). Using water-wetted gauze, the rubbing test was carried out 25 cycles. On visual observation, the sample was rated according to the following criterion.
- ○: no color transfer to gauze
- Δ: some color transfer
- ×: complete color transfer, printed area color faded j) Ink Absorption (Humidity Resistance)

The printed paper was held at 50° C. and humidity 90% for one day, after which it was rated by visual observation according to the following criterion.
- ○: no bleeding in printed area
- Δ: some bleeding from printed area
- ×: full bleeding IV. Evaluation of Performance as Dye Diffusion Transfer Receiving Layer

[Preparation of Dye Diffusion Transfer Receiving Layer]

Using a printer Canon Selphy CP-750, an overall black image (solidly shaded image) was printed on sample C. Rating was made by visual observation according to the following criterion.

k) Color Development
- ○: clearly printed without decolorization
- Δ: partially decolorized
- ×: decolorized and color faded l) Parting A noise produced upon parting of the ink ribbon from the receiving layer during printing was heard and rated for its volume.
- ○: no problem, satisfactory results
- Δ: noise-making tendency, but acceptable
- ×: problematic, unacceptable level of noise m) Humidity Resistance The printed paper was held at 50° C. and humidity 90% for one day, after which it was rated by visual observation according to the following criterion.
- ○: no bleeding in printed area
- Δ: some bleeding from printed area
- ×: full bleeding

TABLE 2

| | | Example | | | | | | | | | | | | |
|---|---|---|---|---|---|---|---|---|---|---|---|---|---|---|
| | Composition (pbw) | 1 | 2 | 3 | 4 | 5 | 6 | 7 | 8 | 9 | 10 | 11 | 12 | 13 |
| (D) | Seed #1 | 10 | 25 | 50 | | | | 25 | 25 | 25 | | | | |
| | Seed #2 | | | | 10 | 25 | 50 | | | | | | | |
| | Seed #3 | | | | | | | | | | | 25 | | |
| | Seed #4 | | | | | | | | | | | | 25 | |

TABLE 2-continued

| | Composition (pbw) | Example 1 | 2 | 3 | 4 | 5 | 6 | 7 | 8 | 9 | 10 | 11 | 12 | 13 |
|---|---|---|---|---|---|---|---|---|---|---|---|---|---|---|
| | Seed #5 | | | | | | | | | | | | 25 | |
| | Seed #6 | | | | | | | | | | | | | 25 |
| (E) | Vinyl chloride | 100 | 100 | 100 | 100 | 100 | 100 | 80 | 80 | 75 | 100 | 100 | 100 | 100 |
| (F) | Vinyl acetate | | | | | | | 20 | | | | | | |
| | Ethyl acrylate | | | | | | | | 20 | 20 | | | | |
| | Acrylic acid | | | | | | | | | 5 | | | | |
| Emulsifier | Noigen XL-6190 | | | | | | | | | | | | | |
| | Pelex SS-L | | | | | | | | | | | | | |
| Solid content (%) | | 30 | 30 | 30 | 30 | 30 | 30 | 30 | 30 | 30 | 30 | 30 | 30 | 30 |
| pH | | 7.0 | 7.0 | 7.0 | 7.0 | 6.5 | 7.5 | 4.5 | 6.5 | 3.5 | 7.0 | 6.5 | 6.5 | 5.5 |
| Viscosity (mPa·s) | | 10 | 10 | 10 | 10 | 10 | 10 | 2,000 | 400 | 1,500 | 200 | 1,000 | 300 | 1,200 |
| Average particle size (nm) | | 190 | 150 | 130 | 200 | 170 | 150 | 800 | 400 | 600 | 300 | 600 | 500 | 1,000 |
| Polymerization stability | | ○ | ○ | ○ | ○ | ○ | ○ | ○ | ○ | ○ | ○ | ○ | ○ | ○ |
| Performance evaluation | I  a) Water resistance | ○ | ○ | ○ | ○ | ○ | ○ | ○ | ○ | ○ | ○ | ○ | ○ | ○ |
| | b) Humidity resistance | ○ | ○ | ○ | ○ | ○ | ○ | ○ | ○ | ○ | ○ | ○ | ○ | ○ |
| | c) Gloss | ○ | ○ | ○ | ○ | ○ | ○ | ○ | ○ | ○ | ○ | ○ | ○ | ○ |
| | d) Alcohol resistance | ○ | ○ | ○ | ○ | ○ | ○ | △ | ○ | △ | ○ | △ | △ | △ |
| | Coating weight (g/m$^2$) | 3.5 | 3.5 | 3.5 | 3.5 | 3.5 | 3.5 | 3.5 | 3.5 | 3.5 | 3.5 | 3.5 | 3.5 | 3.5 |
| | II  e) Tone | ○ | ○ | ○ | ○ | ○ | ○ | ○ | ○ | ○ | △ | △ | △ | △ |
| | f) Adhesion | ○ | ○ | ○ | ○ | ○ | ○ | ○ | △ | △ | ○ | ○ | △ | △ |
| | g) Dispersion (aging stability) | ○ | ○ | ○ | ○ | ○ | ○ | ○ | ○ | ○ | ○ | ○ | △ | △ |
| | Coating weight (g/m$^2$) | 3.6 | 3.6 | 3.6 | 3.6 | 3.6 | 3.6 | 3.6 | 3.6 | 3.6 | 3.6 | 3.6 | 3.6 | 3.6 |
| | III  h) Color development | ○ | ○ | ○ | ○ | ○ | ○ | △ | △ | △ | ○ | ○ | △ | △ |
| | i) Ink absorption (water resistance) | ○ | ○ | ○ | ○ | ○ | ○ | ○ | ○ | ○ | △ | △ | ○ | ○ |
| | j) Ink absorption (humidity resistance) | ○ | ○ | ○ | ○ | ○ | ○ | ○ | ○ | ○ | ○ | ○ | ○ | ○ |
| | Coating weight (g/m$^2$) | 3.3 | 3.5 | 3.7 | 3.3 | 4 | 3.4 | 3.5 | 3 | 3 | 3.2 | 3.3 | 3.3 | 3.5 |
| | IV  k) Color development | ○ | △ | △ | ○ | △ | △ | △ | △ | △ | ○ | △ | △ | △ |
| | l) Parting | ○ | ○ | △ | ○ | △ | △ | △ | △ | △ | △ | △ | △ | △ |
| | m) Humidity resistance | ○ | ○ | ○ | ○ | ○ | ○ | ○ | ○ | ○ | △ | △ | △ | △ |

TABLE 3

| | Composition (pbw) | Comparative Example 1 | 2 | 3 | 4 | 5 | 6 | 7 |
|---|---|---|---|---|---|---|---|---|
| (D) | Seed #1 | 1 | 60 | | | | | |
| | Seed #2 | | | 1 | 60 | | | |
| (A) | JONCRYL JDX-6500 | | | | | 100 | | |
| (E) | Vinyl chloride | 100 | 100 | 100 | 100 | 100 | 70 | 90 |
| (F) | Vinyl acetate | | | | | | 30 | |
| | Ethyl acrylate | | | | | | | 10 |
| | Acrylic acid | | | | | | | |
| Emulsifier | Noigen XL-6190 | | | | | | 3 | 3 |
| | Pelex SS-L | | | | | | 3 | 3 |
| Solid content (%) | | 30 | 3 | 30 | 30 | 30 | 25 | 26 |
| pH | | 8.0 | 7.5 | 8.0 | 7.5 | 5.0 | 7.5 | 7.5 |
| Viscosity (mPa·s) | | 10 | 10 | 10 | 10 | 100 | 10 | 300 |
| Average particle size (nm) | | 1,200 | 100 | 900 | 80 | 250 | 150 | 200 |
| Polymerization stability | | x | △ | x | △ | ○ | ○ | ○ |
| Performance evaluation | I  a) Water resistance | ○ | △ | ○ | △ | ○ | △ | x |
| | b) Humidity resistance | ○ | △ | ○ | △ | ○ | △ | x |
| | c) Gloss | x | △ | x | x | ○ | △ | △ |
| | d) Alcohol resistance | ○ | x | ○ | △ | ○ | ○ | ○ |
| | Coating weight (g/m$^2$) | 3.5 | 3.5 | 3.5 | 3.5 | 3.5 | 3.5 | 3.5 |
| | II  e) Tone | △ | x | △ | x | ○ | △ | △ |
| | f) Adhesion | x | x | x | x | ○ | x | x |
| | g) Dispersion (aging stability) | ○ | △ | ○ | x | ○ | x | x |
| | Coating weight (g/m$^2$) | 3.6 | 3.6 | 3.6 | 3.6 | 3.6 | 3.6 | 3.6 |
| | III  h) Color development | ○ | x | ○ | x | ○ | △ | ○ |
| | i) Ink absorption (water resistance) | ○ | △ | ○ | △ | ○ | △ | x |
| | j) Ink absorption (humidity resistance) | ○ | △ | ○ | △ | ○ | △ | x |
| | Coating weight (g/m$^2$) | 3.2 | 3.4 | 3.3 | 3.3 | 3.2 | 3.7 | 3.4 |

TABLE 3-continued

|  | Composition (pbw) | Comparative Example | | | | | | |
|---|---|---|---|---|---|---|---|---|
|  |  | 1 | 2 | 3 | 4 | 5 | 6 | 7 |
| IV | k) Color development | Δ | x | Δ | x | Δ | Δ | ○ |
|  | l) Parting | ○ | ○ | ○ | ○ | x | x | Δ |
|  | m) Humidity resistance | ○ | ○ | ○ | ○ | ○ | Δ | x |

JONCRYL JDX-6500: BASF AG, acrylate oligomer, number average molecular weight = 10,000
Noigen XL-6190: Dai-ichi Kogyo Seiyaku Co., Ltd., nonionic emulsifier
Pelex SS-L: Kao Corp., anionic emulsifier

The invention claimed is:

1. A vinyl chloride resin emulsion which is obtained by emulsion polymerizing 100 parts by weight of a vinyl chloride monomer (B) or a monomer mixture of a vinyl chloride monomer (B) and an ethylenically unsaturated group-containing monomer (C) copolymerizable therewith in the presence of 40 to 500 parts by weight of (A) a styrene-acrylic acid ester oligomer and/or an acrylic acid ester oligomer, to form a vinyl chloride polymer emulsion as a seed (D), and
emulsion polymerizing 100 parts by weight of a vinyl chloride monomer (E) or a monomer mixture of a vinyl chloride monomer (E) and an ethylenically unsaturated group-containing monomer (F) copolymerizable therewith, using 3 to 50 parts by weight as solids of the seed (D).

2. The vinyl chloride resin emulsion of claim 1 wherein the oligomer (A) has a number average molecular weight of 5,000 to 50,000.

3. The vinyl chloride resin emulsion of claim 1 wherein the seed (D) has an average particle size of 20 to 800 nm.

4. A method for preparing a vinyl chloride resin emulsion, comprising the steps of:
emulsion polymerizing 100 parts by weight of a vinyl chloride monomer (B) or a monomer mixture of a vinyl chloride monomer (B) and an ethylenically unsaturated group-containing monomer (C) copolymerizable therewith in the presence of 40 to 500 parts by weight (A) a styrene-acrylic acid ester oligomer and/or an acrylic acid ester oligomer, to form a vinyl chloride polymer emulsion as a seed (D), and
emulsion polymerizing 100 parts by weight of a vinyl chloride monomer (E) or a monomer mixture of a vinyl chloride monomer (E) and an ethylenically unsaturated group-containing monomer (F) copolymerizable therewith, using 3 to 50 parts by weight as solids of the seed (D).

5. The method of claim 4 wherein the oligomer (A) has a number average molecular weight of 5,000 to 50,000.

6. The method of claim 4 wherein the seed (D) has an average particle size of 20 to 800 nm.

7. An aqueous ink composition comprising the vinyl chloride resin emulsion of claim 1.

8. The aqueous ink composition of claim 7 wherein the vinyl chloride resin emulsion is present in an amount of 2 to 30% by weight as solids, said composition further comprising 3 to 40% by weight of a colorant, 0 to 50% by weight of a water-soluble organic solvent, and 5 to 95% by weight of water.

9. A recording sheet having a coating of the vinyl chloride resin emulsion of claim 1.

10. The recording sheet of claim 9 wherein said coating forms a receiving layer.

11. The recording sheet of claim 9 wherein said coating is formed from a composition comprising 2 to 30% by weight as solids of the vinyl chloride resin emulsion, and further comprising 0 to 30% by weight of a pigment, 0 to 60% by weight of a water-soluble organic solvent, and 5 to 98% by weight of water.

12. The vinyl chloride resin emulsion of claim 2 wherein the seed (D) has an average particle size of 20 to 800 nm.

13. The method of claim 5 wherein the seed (D) has an average particle size of 20 to 800 nm.

14. The recording sheet of claim 10 wherein said coating is formed from a composition comprising 2 to 30% by weight as solids of the vinyl chloride resin emulsion, and further comprising 0 to 30% by weight of a pigment, 0 to 60% by weight of a water-soluble organic solvent, and 5 to 98% by weight of water.

* * * * *